US009981253B2

(12) United States Patent
Colozzi et al.

(10) Patent No.: US 9,981,253 B2
(45) Date of Patent: *May 29, 2018

(54) CATALYST FOR A SULPHUR RECOVERY PROCESS WITH CONCURRENT HYDROGEN PRODUCTION, METHOD OF MAKING THEREOF AND THE SULPHUR RECOVERY PROCESS WITH CONCURRENT HYDROGEN PRODUCTION USING THE CATALYST

(71) Applicant: STAMICARBON B.V. ACTING UNDER THE NAME OF MT INNOVATION CENTER, Sittard (NL)

(72) Inventors: Michele Colozzi, Rome (IT); Lucia Barbato, Rome (IT); Fabio Angelini, Rome (IT); Emma Palo, Rome (IT); Vincenzo Palma, Fisciano (IT); Vincenzo Vaiano, Fisciano (IT)

(73) Assignee: STAMICARBON B.V. ACTING UNDER THE NAME OF MT INNOVATION CENTER, Sittard (NL)

(*) Notice: Subject to any disclaimer, the term of this patent is extended or adjusted under 35 U.S.C. 154(b) by 60 days.

This patent is subject to a terminal disclaimer.

(21) Appl. No.: 15/395,093

(22) Filed: Dec. 30, 2016

(65) Prior Publication Data

US 2017/0106355 A1    Apr. 20, 2017

Related U.S. Application Data

(63) Continuation of application No. 14/441,155, filed as application No. PCT/NL2013/050804 on Nov. 8, 2013.

(30) Foreign Application Priority Data

Nov. 8, 2012 (EP) .................................. 12191734

(51) Int. Cl.
| | | |
|---|---|---|
| *B01J 37/20* | (2006.01) | |
| *B01J 37/02* | (2006.01) | |
| *B01J 37/08* | (2006.01) | |
| *C01B 3/04* | (2006.01) | |
| *C01B 17/04* | (2006.01) | |
| *B01J 27/051* | (2006.01) | |

(52) U.S. Cl.
CPC ....... *B01J 27/0515* (2013.01); *B01J 37/0215* (2013.01); *B01J 37/08* (2013.01); *B01J 37/20* (2013.01); *C01B 3/04* (2013.01); *C01B 17/046* (2013.01); *C01B 17/0495* (2013.01)

(58) Field of Classification Search
CPC ...... B01J 23/881; B01J 37/20; B01J 27/0515; B01J 37/0207; B01J 37/0201; B01J 37/08; B01J 35/08; C01B 17/0465; C01B 17/0495; C01B 3/04; Y02E 60/364
See application file for complete search history.

(56) References Cited

U.S. PATENT DOCUMENTS

| | | | | |
|---|---|---|---|---|
| 4,481,181 | A * | 11/1984 | Norman | C01B 3/02 423/571 |
| 4,666,878 | A | 5/1987 | Jacobson et al. | |
| 5,948,382 | A * | 9/1999 | Li | B01D 53/8612 423/230 |
| 2001/0000475 | A1* | 4/2001 | Jin | B01D 53/8609 427/226 |
| 2003/0031607 | A1* | 2/2003 | Streicher | C01B 3/04 422/173 |
| 2004/0077906 | A1* | 4/2004 | Dalloro | B01J 23/28 568/799 |

FOREIGN PATENT DOCUMENTS

| | | | |
|---|---|---|---|
| CN | 101445426 | 6/2009 | |
| CN | 101745400 | 6/2010 | |
| CN | 101822985 | 9/2010 | |
| WO | WO-2011/050439 | 5/2011 | |
| WO | WO 2011050439 A1 * | 5/2011 | ............... C01B 3/04 |

OTHER PUBLICATIONS

International Search Report and Written Opinion for PCT/NL2013/050804, dated Feb. 4, 2014, 19 pages.
Ramselaar et al., "Sulfidation of alumina-supported iron and iron-molybdenum oxide catalysts," Applied Catalysis (1990) 65:69-84.

* cited by examiner

*Primary Examiner* — Anthony J Zimmer
*Assistant Examiner* — Syed T Iqbal
(74) *Attorney, Agent, or Firm* — Morrison & Foerster LLP

(57) ABSTRACT

Disclosed is a catalyst suitable for the catalytic oxidative cracking of a $H_2S$-containing gas stream, particularly in the event that the stream also contains methane and/or ammonia. The catalyst comprises iron and molybdenum supported by a carrier comprising aluminum. The carrier preferably is alumina. The iron and molybdenum preferably are in the form of sulphides. Also disclosed is a method for the production of hydrogen from a $H_2S$-containing gas stream, comprising subjecting the gas stream to catalytic oxidative cracking so as to form $H_2$ and $S_2$, using a catalyst in accordance with any one of the preceding claims.

20 Claims, No Drawings

CATALYST FOR A SULPHUR RECOVERY PROCESS WITH CONCURRENT HYDROGEN PRODUCTION, METHOD OF MAKING THEREOF AND THE SULPHUR RECOVERY PROCESS WITH CONCURRENT HYDROGEN PRODUCTION USING THE CATALYST

CROSS-REFERENCE TO RELATED APPLICATIONS

This application is a continuation of U.S. Ser. No. 14/441,155 having an international filing date of 8 Nov. 2013 (now allowed), which is the national phase of PCT application PCT/NL2013/050804 having an international filing date of 8 Nov. 2013, which claims benefit of European patent application No. 12191734.8 filed 8 Nov. 2012. The contents of the above patent applications are incorporated by reference herein in their entirety.

FIELD OF THE INVENTION

The invention pertains to a catalyst suitable for a catalytic oxidative process for recovering sulphur from a $H_2S$-containing gas stream.

BACKGROUND OF THE INVENTION

Sulphur Recovery Plants are designed to remove $H_2S$ from $H_2S$-containing acid gases from Amine Regeneration Systems and from Sour Water Strippers producing sulphur, a non-toxic product which can be stored and sold in liquid or in solid form to different users for several different industrial applications. The acid gases from Amine Regeneration Systems and Sour Water Strippers, containing a variable amount of $H_2S$, are treated in a Sulphur Recovery Unit (SRU), generally based on the modified Claus process, for bulk sulphur recovery and subsequently in a Tail Gas Treatment (TGT) section for deep sulphur recovery. Other impurities contained in the sour gases, including ammonia and hydrocarbons, are destroyed in the Claus section.

The modified Claus process by itself recovers about 94÷96% (2 catalytic stages) or 95÷98% (3 stages) of the sulphur in the feedstock. A further treatment of the Claus tail gas is therefore necessary when a higher Sulphur Recovery Efficiency (SRE) is required.

The modified Claus process comprises a sub-stoichiometric combustion of the acid gas stream in a thermal reactor (thermal stage) followed by catalytic conversion in the Claus reactors (catalytic stage). In the Claus section one-third of the total $H_2S$ is oxidized to $SO_2$, which reacts with the remaining $H_2S$ to form sulphur and water according to the following reactions:

$$H_2S+1.5O_2 \rightarrow H_2O+SO_2 \text{ (oxidation reaction)} \qquad (1)$$

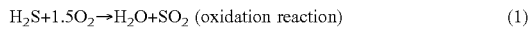

$$2H_2S+SO_2 \leftrightarrow 1.5S_2+2H_2O \text{ (Claus reaction)} \qquad (2)$$

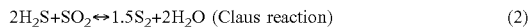

$$3H_2S+1.5O_2 \leftrightarrow 3H_2O+1.5S_2 \text{ (overall reaction)} \qquad (3)$$

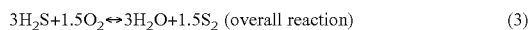

The goal of the process is to drive the overall reaction to near completion. In the Claus thermal reactor, the $H_2S$ contained in the acid gas is burnt with air (or with oxygen-enriched air in some specific cases) in a specific burner and only one-third of the total $H_2S$ is oxidized to $SO_2$, while the remaining two-third is not reacted. The total air amount is the one exactly sufficient to oxidize one-third of the total $H_2S$ and to completely oxidize all hydrocarbons and ammonia contained in the feedstock; the molar ratio $H_2S/O_2$ in the feedstock is therefore about 2:1 in order to get a ratio $H_2S/SO_2$ in the Claus tail gas of exactly, or as close as possible to, 2:1, which is the stoichiometric ratio for the Claus reaction, so maximizing Sulphur Recovery Efficiency. During acid gas combustion, a small part of the $H_2S$ (typically 5÷7%) is dissociated to hydrogen and sulphur as per following reaction:

$$H_2S \leftrightarrow H_2+0.5S_2 \text{ (dissociation or cracking reaction)} \qquad (4)$$

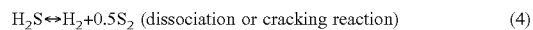

According to Clark et al., Alberta Sulphur Research Ltd. (ASRL), hydrogen formation also happens according to the following reaction:

$$4H_2S+O_2 \leftrightarrow 2H_2+2H_2O+2S_2 \text{(}H_2 \text{ formation reaction)} \qquad (5)$$

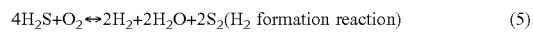

Several side reactions are also involved, leading to the destruction of ammonia and hydrocarbons and to the formation of carbonyl sulphide COS and carbon disulphide $CS_2$. In order to complete the Claus reactions, a suitable residence time is necessary at high temperature in the thermal reactor.

The Claus thermal reactor is typically followed by a waste heat boiler where furnace effluent is cooled down to about 300° C. and heat is recovered by raising high pressure steam and by a sulphur condenser where process gas is cooled down to sulphur dew point by raising low pressure steam and liquid sulphur is separated.

The Claus thermal stage is generally followed by two or three catalytic stages, each one composed by a gas reheater to bring the gas to the optimal reaction temperature, a catalytic reactor where the Claus reaction takes place and a sulphur condenser where gas is cooled and liquid sulphur is condensed and separated. The Claus reaction is an exothermic equilibrium reaction thermodynamically enhanced by low temperatures. The first Claus catalytic reactor is partly filled with a Claus catalyst (Alumina based) to enhance the Claus reaction and partly filled with a specific high conversion catalyst (Titania based) to enhance the hydrolysis of COS and $CS_2$. The second and third Claus catalytic reactors, if any, are generally filled with Claus catalyst (Alumina based) to enhance Claus reaction.

In order to satisfy the >99% sulphur recovery efficiency normally required for a Sulphur Recovery Plant, the Claus section is generally followed by a Tail Gas Treatment section. Several different alternative processes have been proposed over the years to boost Sulphur Recovery Efficiency, like the SCOT method, the RAR process, the CBA process, the CLINSULF/DEGSULF method or the BSR Selectox process. In the traditional reductive Tail Gas Treatment section, the process gas from a Claus section is preheated and combined with hydrogen from an external source prior to being fed to a hydrogenation reactor, where all sulphur compounds are converted to $H_2S$ over a specific reduction catalyst (Co and Mo oxides based), which performs both the hydrogenation and the hydrolysis functions. The reactor effluent is cooled down in the quench tower by means of circulating steam condensate. The $H_2S$ produced in the hydrogenation reactor is recovered in an amine absorber with a specific amine aqueous solution and recycled to the Claus section from the top of an amine regenerator, where the enriched solution is stripped.

The tail gas from the amine absorber is sent to a thermal incinerator for the oxidation of residual $H_2S$ and other sulphur compounds, such as COS and $CS_2$, to $SO_2$ prior to disposal to the atmosphere via a dedicated stack.

The main drawbacks of traditional Claus Plant are the need for large and expensive equipment against very low sulphur economic value, continuous emissions of $SO_x$ ($SO_2$ and $SO_3$), CO, $CO_2$, $NO_x$ plus traces of $H_2S$ into the atmosphere, and continuous import of hydrogen from the network, for process gas reduction in the TGT section.

In some Plants, where hydrogen is not available, for example in gas fields, the reducing gas mixture is generated in a reducing gas generator by sub-stoichiometric fuel gas combustion. The main drawback of such alternative configuration is the larger equipment size compared to traditional Claus Plant. This is caused by the 10-15% higher process gas flow rate due to large amounts of inerts coming from in-line fuel gas combustion (mainly nitrogen from air and water and carbon dioxide from combustion).

As mentioned in Clark, Catalysis Communications 5 (2004) 743-747, the recovery of $H_2$ from $H_2S$ is a long-standing goal in industry. Clark addresses this by means of the partial oxidation of $H_2S$ over alumina catalysts. Key to this process is said to be the promotion of the reaction of $H_2S$ and $O_2$ under the formation of hydrogen, water, and sulphur at a controlled temperature by means of an external oven. Reduction of emissions into the atmosphere is not addressed.

Some alternative processes have been proposed over the years, which are addressed to thermal or catalytic partial oxidation of $H_2S$.

U.S. Pat. Nos. 6,946,111 and 6,800,269 by Conoco Inc. disclose processes for removing $H_2S$ from a $H_2S$-containing gas stream the first one and from a $H_2S$-rich waste gas stream the second one, comprising a flameless short contact time reactor filled with a suitable catalyst for partial oxidation reaction of $H_2S$ to form sulphur and water, using air or enriched air or pure oxygen with a $H_2S/O_2$ ratio in the feedstock of approximately 2:1, followed by a cooling zone and by a sulphur condenser. The main goal of the first Patent is to desulphurize a gas stream, while the main goal of the second Patent is to propose an alternative solution to the traditional thermal reactor in a Claus Plant. Both Patents are based on hydrogen sulphide catalytic partial oxidation reaction with oxygen to form sulphur and water.

U.S. Pat. No. 7,560,088 by Conoco Phillips Company discloses a process for removing sulphur from a $H_2S$-containing gas stream using a compact system comprising a flameless short contact time catalytic partial oxidation reaction zone followed by a temperature-control zone, a first Claus catalytic reaction zone, a second temperature-control zone, a first liquid sulphur outlet and a first effluent gas outlet. The main goal of this Patent is to propose an alternative solution to traditional Claus Plant based on hydrogen sulphide catalytic partial oxidation to form sulphur and water.

U.S. Pat. No. 4,481,181 by GA Technologies Inc. discloses a process for removing sulphur and recovering hydrogen from a $H_2S$-containing gas stream coupling thermal partial oxidation of $H_2S$ to sulphur and water and thermal dissociation of $H_2S$ to hydrogen and sulphur in the same reaction zone, preceded by feedstock heating section and followed by a cooling zone and by a sulphur condenser, using pure oxygen and a substantial proportion of nitrogen with a $H_2S/O_2$ ratio in the feedstock between 10:1 and 25:1. The main goal of this Patent is to thermally decompose by partial oxidation and dissociation hydrogen sulphide into sulphur and hydrogen.

WO2010/036941 by Chevron U.S.A. Inc. and Drexel University discloses a method for performing $H_2S$ thermal dissociation at temperature below 1600° C. based on H and SH radicals, in one embodiment over a suitable plasma catalyst.

Furthermore, Italian Patent 1 203 898 by Siirtec-Nigi discloses a process called HCR based on the operation of the traditional Claus thermal reactor at a slightly higher $H_2S/O_2$ ratio in the feedstock in order to keep a $H_2S/SO_2$ ratio in the Claus tail gas significantly higher than 2:1. The main goal of this process is to boost hydrogen production in thermal reactor and to avoid hydrogen import in the TGT section. Also with such a process, Sulphur Recovery Plant emissions are not avoided.

From the above discussion, it is evident that several efforts have been made in the past, trying to propose a valid alternative to traditional Claus Plant. In particular, some processes which have been proposed over the years are based on the thermal or catalytic partial oxidation of $H_2S$, while some other processes are focused on the thermal or catalytic cracking of $H_2S$. None of the proposed processes is conceived and arranged to perform $H_2S$ conversion to hydrogen and sulphur over a suitable catalyst able to favour both reactions at the same time.

In our co-pending application PCT/NL2012/050308, a method is described for the production of hydrogen from a $H_2S$-containing gas stream, comprising subjecting the gas stream to catalytic oxidative cracking so as to form $H_2$ and $S_2$. The invention described therein serves to address the problem of gas emissions into the atmosphere and producing at the same time a valuable hydrogen export stream.

An issue with $H_2S$-containing gas streams as these are regularly provided to sulphur recovery facilities, is the co-presence of methane. Methane is prone to being converted in sulphur compounds such as $CS_2$ or COS, which is undesirable. Another issue with $H_2S$-containing gas streams as these are regularly provided to sulphur recovery facilities, is the co-presence of ammonia. The ammonia is typically converted in the thermal stage of the Claus plant. However, the thermal conversion of ammonia embodies a risk, occurring upon incomplete burning, of the formation of solid salts such as ammonium sulphides or sulphites. These salts cause blockage in the coldest sections of the Claus plant, in particular in the sulphur condensers. In order to burn the ammonia properly, a homogeneous mixture of ammonia and air is required, along with a high flame temperature. However, the formation of nitrogen oxides encourages the oxidation of sulphur dioxide, $SO_2$, to sulphur trioxide, $SO_3$. The Claus catalyst then becomes sulphided and the cold portions of the unit are seen to corrode.

It would be desirable to provide a catalyst that is active and selective in the oxidative cracking of $H_2S$ particularly in the event of the concomitant presence of $NH_3$ and/or $CH_4$, and more generally, carbon containing compounds.

SUMMARY OF THE INVENTION

In order to better address one or more of the foregoing desires, the invention presents, in one aspect, a catalyst composition suitable for the catalytic oxidative cracking of a $H_2S$-containing gas stream, the catalyst composition comprising iron and molybdenum supported by a carrier comprising aluminium.

In another aspect, the invention pertains to a method of making a catalyst as defined above, comprising providing an aqueous solution of precursors for iron and molybdenum, selected from the group consisting of iron tetracarbonyl, iron pentacarbonyl, iron nonacarbonyl, iron nitrates, iron bromides, iron chlorides, iron fluorides, iron phosphates, iron sulphates, iron acetylacetonates, iron acetates, iron fumarates, iron gluconates, iron citrates, iron benzoates, iron maleates, iron oxalates, iron oleates, and iron stearates, iron-ammonium complexes and the analogous molybdenum precursors.

In a still further aspect, the invention provides a method for the production of hydrogen from a $H_2S$ and optionally $NH_3$ and $CH_4$-containing gas stream, comprising subjecting the gas stream to catalytic oxidative cracking so as to form $H_2$ and $S_2$, using a catalyst as defined above.

DETAILED DESCRIPTION OF THE INVENTION

The invention, in a broad sense, is based on the recognition of a judicious combination of catalytically active metals, and on using these in the form of a catalyst of the supported type. The metals of choice are iron and molybdenum, and the support is a carrier comprising aluminium.

A supported catalyst will be understood as pertaining to a catalyst composition comprising a catalytically active part (i.e. particles as provided that are either active, or are converted into an active phase in situ), and a catalytically non-active part, wherein the catalytically non-active part (the support) generally forms the majority of the catalyst. This distinguishes a supported catalyst from a bulk-catalyst, in which the catalytically non-active part is generally the minority. Thus, in a supported catalyst, the catalytically non-active part is generally more than 50% by weight of the catalyst composition. Preferably the support forms more than 60% by weight and more preferably more than 80% by weight of the total catalyst composition.

The catalytically active part of the catalyst composition comprises iron and molybdenum. These metals are typically present in the form of particles dispersed onto the support, in an amount of at least 1 wt. % and generally up to 50 wt. % by weight of the catalyst composition. The support contains aluminium, and will generally be alumina ($Al_2O_3$). The alumina can be, e.g., alpha- or theta or gamma-alumina.

The iron more preferably is present in the catalyst composition in a range of from 1 to 50% by weight, most preferably 2% by weight of the catalyst composition. The molybdenum is present in the catalyst composition in a range of from 1 to 50% by weight, most preferably 6% by weight of the catalyst composition.

The catalyst may consist essentially of the catalyst composition, i.e. the aluminium-containing carrier, and iron and molybdenum contained thereon. If so, the catalyst will generally be in a suitably shaped form, e.g. a powder or a pellet. The catalyst may also, in addition to the catalyst composition comprising a carrier and the active metals, contain a mechanical support structure, i.e. a substrate.

It will be understood that such a substrate is not part of the catalyst composition as defined above, but comes in addition thereto. A substrate may be any structure known in the art as a substrate for catalysts. In one embodiment of the present invention, the substrate may be in the form of beads, pellets, honeycomb monolith or open cell foams. The substrate may be formed from alumina, silica alumina, silica, titania, mixtures thereof, or any other suitable material as available in the field of catalyst substrates.

If the catalyst comprises a substrate, then this will typically be coated with the supported catalyst composition of alumina, iron, and molybdenum.

In a preferred embodiment, the catalytically active metals are in the form of their sulphides. I.e., the iron preferably is in the form of iron sulphide, the molybdenum preferably is in the form of molybdenum sulphide, and most preferably both are present in the form of sulphide.

The catalyst composition of the invention can be prepared in a manner known to the skilled person. Reference is made, e.g., to "Catalyst Handbook", M. V. Twigg (Ed.), Wolfe Publishing Ltd, 1989, and to "Structured Catalysts And Reactors", A. Cybulski and J. A. Moulijn (Eds.), Marcel Dekker Inc., 1998—Chapter 21 (Transformation of a structured carrier into structured catalyst), pp. 599-615.

In a particularly suitable method, an aqueous solution is provided of a precursor, and dispersing the solution onto a carrier material as defined in claim 1 or 4. Examples of iron containing precursors are inorganic and organic iron salts, iron chelates, iron clusters, iron hydroxides and oxi-hydroxides, and iron organometallic complexes. Representative of these compounds are iron tetracarbonyl, iron pentacarbonyl, iron nonacarbonyl, iron nitrates, bromides, chlorides, fluorides, phosphates, sulphates, acetylacetonates, acetates, fumarates, gluconates, citrates, benzoates, maleates, oxalates, oleates, stearates, and the like. Iron precursors can provide iron in a ferrous form, a ferric form, or a combination thereof. The catalyst precursors preferably comprise Fe(II) or Fe(III) in combination with organic ligands or anions such as acetate, citrate, EDTA (ethylene diamine tetra acetate) or NTA (nitrilo triacetate). The same holds, mutatis mutandis, for molybdenum. Preferred are iron acetate and ammonium-hepta-molybdate.

In a particularly preferred embodiment, the carrier is first calcined prior to the impregnation with a solution of the precursor. Calcination is preferably performed at a temperature higher than 700° C., more preferably at least 750° C., most preferably in the range 750-1000° C. Preferably, the calcination is performed in the presence of oxygen, more preferably, in air. After the calcination, the active catalyst metal is applied to the calcined support as described above. For example, wet impregnation or precipitation of the catalytic metal can be used. Without wishing to be bound by theory, it is believed that the calcination as described above allows to stabilize the structure of the catalyst. In this way, the obtained catalyst is particularly suitable for the high temperatures, e.g. 1100° C., involved in the catalytic oxidative cracking. In this embodiment, it is important to do the calcining step first to produce a stabilized support and subsequently apply the catalytic metal to it. If the process is carried out in reverse, it is believed that the catalyst structure could change in the way that the catalytic metal would not be available for the catalytic reaction.

The invention further pertains to a method for the production of hydrogen from a $H_2S$-containing gas stream, comprising subjecting the gas stream to catalytic oxidative cracking so as to form $H_2$ and $S_2$, using a catalyst as defined above.

It is emphasized that the catalytic oxidative cracking in accordance with this aspect of the invention is a fundamentally different process from both the thermal stage and the catalytic stage in an existing Claus-type process. With reference to the reaction equations (1) to (5) mentioned above, the Claus processes are directed to driving the above reaction (3) to near completion. The present invention is based on the judicious insight to provide a process based on the side reactions (4) and (5), and to promote these reactions for the production, from a $H_2S$-containing gas-stream, of both hydrogen and sulphur.

The process of the invention is also fundamentally different from the recent proposals by Clark et al. The references authored by the latter, are based on a theory of direct oxidation of $H_2S$ under the formation of hydrogen, water and sulphur. The resulting conversion, whilst avoiding the formation of $SO_2$, is subject to improvement as to the conversion of $H_2S$ and the production of sulphur concurrently with $H_2$.

In the present invention a Catalytic Oxidative Cracking (COC) stage substitutes the Claus thermal stage. The process of the invention thus favours $H_2S$ dissociation and partial oxidation instead of complete oxidation and Claus reaction. However, it is not excluded to add a Claus thermal stage after the COC stage.

The catalytic oxidative cracking is conducted in one or more reaction zones, preferably provided in one reaction chamber. Throughout the text the term "chamber" may relate to one or more reaction zones. A reaction chamber is defined as a reactor volume with optionally a catalyst bed. In a single reaction chamber there is only a single type of catalyst. Typically the reaction chamber is substantially cylindrical and the reactant flow is in the axial direction. If the reaction chamber comprises a catalyst bed, one or more reactions may take place in the axial direction of the gas flow. In an embodiment where more than one reaction is taking place, the reaction conversion profile for one reaction may be different from that from another reaction. In other words, one reaction may be taking place, e.g., mostly at the beginning of the catalyst bed, whilst the other reaction may take place, e.g., over the total length of the catalyst bed.

The invention presents the skilled person with the insight to promote the above-mentioned reactions (4) and (5). The fact that thereto the gas stream is to be subjected to catalytic oxidative cracking, implies a clear message to the skilled person as to how to carry this out.

In general, the catalyst will be provided, in a conventional manner, on a catalyst bed over which the gas stream to be treated is led. The choice of the types of beds and volumes thereof are well within the ambit of the skilled person's normal capabilities.

The Catalytic Oxidative Cracking reaction zone or zones are provided with oxygen. The oxygen is preferably provided as a gas enriched with oxygen as compared to air. Preferably, this is an oxygen-containing gas-stream comprising at least 40 vol. % oxygen, preferably at least 60 vol. % oxygen. More preferably, this oxygen is provided as substantially pure oxygen, viz. 90 vol. %-99 vol. % of oxygen, or as close to 100% as available.

The use of oxygen-enriched gas, and preferably pure oxygen, is not only related to optimizing the catalytic oxidative cracking process, it also presents advantages such as the avoidance of an unnecessarily large equipment, which would be needed on account of the presence of large volumes of inert (nitrogen) gas. Moreover, with reference to the invention's purpose to produce hydrogen, in addition to sulphur recovery and with reduced emissions, it will be advantageous to reduce, and preferably avoid, the presence of nitrogen in the tail gas of the process.

The quantity of oxygen fed to the reactor is selected so as to achieve a ratio $H_2S/O_2$ in the feedstock higher than the typical figure of about 2:1. Preferably, $H_2S/O_2$ ratio in the feedstock should be in the range 2:1-6:1 or preferably higher than 2:1 and up to 6:1, more preferably in the range 3:1-5:1, still more preferably in the range 4:1-4.5:1.

In the preferred embodiment of operating the catalytic oxidative cracking on the basis of a ratio $H_2S/O_2$ between 4:1 and 4.5:1, most preferred between 4.1:1 and 4.5:1, preferred reaction temperatures to obtain simultaneously cracking and partial oxidation of $H_2S$ are in the range 900° C.-1500° C., preferably in the range of 900° C.-1200° C. More preferably a temperature of about 1100° C. is obtained.

In one embodiment, the feedstock to Catalytic Oxidative Cracking reaction zone or zones ($H_2S$-containing acid gas and oxygen-containing gas) is preheated in order to increase the reaction temperature, to boost hydrogen production and to depress $SO_2$ formation.

In one embodiment of the present invention, the $H_2S$-containing acid gas and the oxygen-containing gas are mixed in a static mixer just before entering the catalytic bed of the Catalytic Oxidative Cracking reaction zone or zones.

In one embodiment the hydrogen concentration in the effluent of the reaction chamber (after quenching) is at least 3 vol %, preferably at least 5 vol % most preferred at least 7 vol %.

It should be noted that the reaction preferably is conducted autothermally. This refers to the fact that, whilst the process is preferably adiabatic, heat exchange takes in fact place, since the oxidation reaction is exothermic, and the cracking reaction is endothermic, whereby heat made available through the exothermic reaction is utilized in the endothermic reaction.

All in all, the process of the invention, by virtue of the judicious choice of catalyst, is believed to favour reactions (4) and (5) relative to reactions (1) and (2), leading to lower $H_2S$ conversion, but on the other hand to significantly higher $H_2$ formation and to much lower $SO_2$ formation. As a consequence of the lower $H_2S$ conversion, a higher acid gas recycle rate from $H_2S$-containing gas source (e.g. an amine regenerator) to reaction chamber is obtained as compared to a traditional Claus Plant.

The catalytic oxidative cracking process of the invention serves to reduce the temperature so as to provide the required reaction equilibrium. This results in increasing the hydrogen yield and minimizing $SO_2$ formation, which in turn serves to minimize hydrogen consumption in the Tail Gas Treatment section to reduce $SO_2$ to $H_2S$.

Preferably, the reaction zone is separately fed with $H_2S$-containing acid gas and the oxygen-containing gas, and these gases are mixed prior to entering the catalytic bed.

The gas effluent from the reaction chamber is preferably quenched so as to avoid recombination of $H_2$ and $S_2$ to form $H_2S$, viz. by the inverse reaction of (4), which would make the process sub-optimal in terms of overall conversion. Preferably this quenching is done substantially instantaneously. The quenching is preferably to a temperature lower than 950° C., preferably in the range 850÷750° C. The residence time in the quench zone is preferably as short as possible, typically of from 10 ms to 300 ms, preferably from 10 ms to 100 ms, more preferably from 10 ms to 50 ms.

The quench zone (which could be a zone of the reaction chamber) is preferably followed by a waste heat boiler and a sulphur condenser to cool down the process gas and to recover liquid sulphur. The latter is preferably done by raising high or medium pressure steam in the waste heat boiler and low or medium pressure steam in the sulphur condenser.

In one embodiment, the quenching of the gas effluent from the reaction chamber is achieved by mixing with water in the final part of the reaction chamber and, the mixing of the gas with water is performed with a water sprayer in a suitable mixing chamber just below the catalytic bed. In a most preferred embodiment the quench (in the sense of fast cooling) is done in the first part of a two-zone waste heat boiler. In this zone with short tubes the gas arrives to temperature of about 700° C. and in the second with conventional tubes it arrives to 350-300° C.

Although the process of the invention substantially reduces the formation of $SO_2$, it will be inevitable that some $SO_2$ is formed. In order to remove such $SO_2$, the Catalytic Oxidative Cracking stage is preferably followed by a Tail Gas Treatment section. Therein a part (e.g. about 10-15 vol. %) of the produced hydrogen is consumed in order to reduce residual $SO_2$ to $H_2S$ in a hydrogenation reactor. Due to the much higher hydrogen content and to the much lower $SO_2$ content in the tail gas compared to traditional Claus Plant, the reduction step of the Tail Gas Treatment section can be performed without any hydrogen import.

The tail gas is preferably preheated and fed to a hydrogenation reactor. Therein the $SO_2$, as well as other residual sulphur compounds, such as COS and $CS_2$, are converted into $H_2S$, which is then removed. This removal can be done in a conventional manner, e.g., by scrubbing the gas with a lean amine solution in an absorber.

In one embodiment, the Catalytic Oxidative Cracking stage is followed by one Claus catalytic stage, comprising a gas reheater, a Claus catalytic reactor and sulphur condenser, in order to convert most of the $SO_2$ into sulphur, thereby minimizing $H_2$ consumption for $SO_2$ reduction in the Tail Gas Treatment section.

In one embodiment, the hydrogen stream obtained from the TGT absorber is sent to end users, like hydrotreaters, hydrocrackers or hydrodesulphurizers. It should be noted that the composition of the hydrogen rich stream from the top of the TGT absorber may be different depending on variables such as SRU feedstock quality, plant configuration and operating conditions, and may include traces or percentages of $H_2O$, $N_2$, CO, $CO_2$, $H_2S$, COS and $CS_2$.

In a preferred embodiment, a hydrogen stream obtained from the TGT absorber is further purified in a Hydrogen Purification section (for example a Pressure Swing Absorber). It should be noted that, prior to purification, the composition of a hydrogen rich stream from the top of the TGT absorber may be different depending on variables such as SRU feedstock quality, plant configuration and operating conditions, and may include traces or percentages of $H_2O$, $N_2$, CO, $CO_2$, $H_2S$, COS and $CS_2$.

The purified hydrogen is sent to end users, like hydrotreaters, hydrocrackers or hydrodesulphurizers.

The invention will be illustrated with reference to the following, non-limiting Examples.

Example 1 (Catalyst Preparation Procedure Through Wet Impregnation/Precipitation)

$Al_2O_3$ in spherical shape of 3 mm diameter was used as support, after preliminary calcination in air at 900° C. for 12 h and grinding to obtain the desired granulometry (355-710 micron).

As salts precursors of the active species were chosen $(CH_3COO)_2Fe$ and ammonium heptamolybdate tetrahydrate $(NH_4)_6Mo_7O_{24}\ 4H_2O$.

The preparation procedure involves the preparation of an aqueous solution of the precursor salt in which the support is further dispersed.

The precursor salt, the amount of which is calculated on the basis of the active species loading, is dissolved in twice distilled water. After the total dissolution, the support is added to the solution under stirring and heating on a heating plate up to almost total water evaporation. The sample is subsequently dried at 120° C. to reach total water evaporation. After the drying procedure the catalyst is pretreated with a mixture of 5% of $H_2S$ in nitrogen and heated up to 1000° C. (heating rate:10° C./min and isothermal for 60 min).

For the preparation of bimetallic samples, the salts precursors of the active species are mixed and then dissolved in 1.5 dm³ of water. In particular, 0.685 g and 0.452 g respectively of ammonium heptamolybdate tetrahydrate and iron acetate and 5 g of alumina were used. The catalyst thus obtained has a nominal loading of 10 wt % of $MoS_2$ and 5 wt % of $FeS_2$, where the loading is calculated in the following:

$MeS_2$ wt %=$MeS_2$ grams*100/($MeS_2$ grams+$Al_2O_3$ grams)

Example 2 (Catalytic Activity Tests)

Two types of catalytic activity tests were performed; the main differences are the composition of the stream fed to the oxidative cracking reactor and the contact time:

40% $H_2S$, 0.7% $CH_4$, 8% $O_2$, balance nitrogen ($H_2S/O_2=5$)

Contact time selected to be 20 or 40 ms

Temperature: 1100° C.

15% $H_2S$, 10% $NH_3$, 11% $O_2$, balance nitrogen

Contact time selected to be 1 or 2 s

Temperature: 1100° C.

It will be understood that the actual contact time will be different depending on the shape of the catalyst (e.g. a powder or a structured catalyst). The contact time, as defined herein, is the ratio between the volume of "catalytic material" with respect to the total volumetric feed flow rate (calculated at 0° C. and 1 atm). The "catalytic material" herein is the active metals (iron and molybdenum), plus the aluminium-containing support. The so-defined contact time ranges from 0.05 s to 5 s, preferably in the range 0.1-1 s.

In the event of a feed comprising ammonia, a higher amount of oxygen is added, since ammonia and $H_2S$ compete for the oxygen consumption. This extra amount of oxygen is preferably such to have a molar ratio $NH_3/O_2$ ranging between 0.9 and 1.5. The $NH_3$ concentration in the feed is ranging between 0 and 45 vol %, whereas the relative $O_2$ concentration is ranging between 0 and 33 vol %. In particular the amount of oxygen was modulated in such a way to have the same $H_2S/O_2$ ratio typical for oxidative cracking (5/1), thus basically we can say that 30% of $O_2$ is consumed by $H_2S$, the remaining 70% is consumed by $NH_3$.

Further, a higher contact time is required since the ammonia is much less reactive than $H_2S$, whereas $H_2S$ and methane show the same reactivity The main results are reported in the following tables

TABLE 1

Catalytic activity tests of oxidative cracking in the presence of methane

| Parameter | Experimental | Equilibrium |
|---|---|---|
| $CH_4$ conversion, % | 100 | 100 |
| $H_2S$ conversion, % | 46 | 54 |
| $H_2$ yield, % | 9 | 19 |
| $SO_2$ selectivity, % | 0-0.3 | 0.4 |
| $CO_2$ selectivity, % | 70 | 45 |

It is observed that the results are not dependent on contact time, and that the formation of sulphur containing compounds such as $CS_2$ and COS is not detected over the whole range of investigated contact time

TABLE 2

Catalytic activity tests of oxidative cracking in the presence of ammonia

| Parameter | Experimental | Equilibrium |
|---|---|---|
| $NH_3$ conversion, % | 100 | 100 |
| $H_2S$ conversion, % | 47-64 | 64 |
| $H_2$ yield, % | 4-6 | 12 |
| $SO_2$ selectivity, % | 0-0.1 | 6 |

It is observed that the results are slightly dependent on contact time, in particular $H_2S$ conversion decreases at decreasing the contact time, whereas the $H_2$ yield has an opposite trend whit an increase at the decreasing of the contact time (Table 3). The formation of $NO_x$ is not detected, since all the oxygen reacting with ammonia is consumed in the reaction of ammonia combustion to nitrogen ($2NH_3 + 3/2O_2 = N_2 + 3H_2O$).

TABLE 3

| Flow rate, Ncc/min | Contact time, s | $H_2S$ conversion, % | $NH_3$ conversion, % | $H_2$ Yield, % | $SO_2$ Selectivity, % |
|---|---|---|---|---|---|
| 300 | 1.2 | 64 | 100 | 4 | 0.07 |
| 900 | 0.4 | 55 | 100 | 5 | 0.08 |
| 1180 | 0.3 | 47 | 100 | 6 | 0.09 |

The invention claimed is:

1. A catalyst suitable for the catalytic oxidative cracking of a $H_2S$-containing gas stream, the catalyst comprising iron and molybdenum supported by a carrier comprising aluminium, wherein the iron is in the form of iron sulfide, wherein the molybdenum is in the form of molybdenum sulfide, wherein the carrier is made up of $Al_2O_3$, wherein the iron is present in the catalyst at 2% by weight of the catalyst and wherein the molybdenum is present in the catalyst at 6% by weight of the catalyst.

2. A method for the production of hydrogen from a $H_2S$-containing gas stream, comprising subjecting the gas stream to catalytic oxidative cracking so as to form $H_2$ and $S_2$, using a catalyst comprising iron and molybdenum supported by a carrier comprising aluminium, wherein the $H_2S$-containing gas stream and an oxygen-containing gas stream are mixed prior to contacting said catalyst in a reaction chamber and the catalytic oxidative cracking is conducted at 900°-1500° C.

3. A method according to claim 2, wherein the catalytic oxidative cracking is conducted with a molar ratio $H_2S/O_2$ in the feedstock higher than 2:1.

4. A method according to claim 3, wherein the ratio is 3:1-5:1.

5. A method according to claim 2, wherein the oxygen-containing gas-stream comprises at least 40 vol. % oxygen.

6. A method according to claim 5, wherein the oxygen-containing gas-stream is oxygen having a purity of from 90-100 vol. %.

7. A method according to claim 2, wherein the catalytic oxidative cracking is conducted in the reaction chamber substantially autothermally at a temperature of from 900° C. to 1500° C.

8. A method according to claim 2, comprising a further step of subjecting formed $SO_2$ to hydrogenation.

9. A method according to claim 2, wherein effluent from the reaction chamber containing gas produced from the catalytic oxidative cracking is, substantially without delay, quenched to a temperature below 950° C.

10. A method according to claim 2, wherein the $H_2S$-containing acid gas and the oxygen-containing gas are mixed in a static mixer before entering a first catalytic bed in a catalytic oxidative cracking reaction zone or zones in said reaction chamber.

11. A method according to claim 2, wherein the catalytic oxidative cracking stage is followed by a Claus catalytic stage, comprising a gas reheater, Claus catalytic reactor and sulphur condenser.

12. A method of making the catalyst of claim 1, the method comprising providing an aqueous solution of precursors for iron and molybdenum, selected from the group consisting of iron tetracarbonyl, iron pentacarbonyl, iron nonacarbonyl, iron nitrates, iron bromides, iron chlorides, iron fluorides, iron phosphates, iron sulphates, iron acetylacetonates, iron acetates, iron fumarates, iron gluconates, iron citrates, iron benzoates, iron maleates, iron oxalates, iron oleates, and iron stearates, iron-ammonium complexes, and the analogous molybdenum precursors, and dispersing the solution onto a carrier comprising aluminium.

13. The method according to claim 12, wherein the carrier is calcined at a temperature higher than 700° C. prior to dispersing of the solution onto the carrier.

14. A method according to claim 3, wherein the catalytic oxidative cracking is conducted with a molar ratio $H_2S/O_2$ in the feedstock in the range of 2:1-6:1.

15. A method according to claim 4, wherein the ratio is 4:1-4.5:1.

16. A method according to claim 5, wherein the catalytic oxidative cracking is conducted using an oxygen-containing gas-stream comprising at least 60 vol. % oxygen.

17. A method according to claim 7, wherein the catalytic oxidative cracking is conducted substantially autothermally at a temperature of from 900° C.-1200° C.

18. A method according to claim 17, wherein the catalytic oxidative cracking is conducted substantially autothermally at a temperature of from 1100° C.

19. The method of claim 2 wherein the $H_2S$-containing gas stream further contains ammonia.

20. The method of claim 19 wherein the oxygen-containing gas stream comprises extra oxygen for reaction with said ammonia to provide a molar ratio $H_2S/O_2$ between 0.9 and 1.5.

* * * * *